(12) United States Patent
Keusch (10) Patent No.: US 8,572,791 B2
(45) Date of Patent: Nov. 5, 2013

(54) DEVICE FOR CLEANING VEHICLE WHEELS

(75) Inventor: Siegfried Keusch, Deizisau (DE)

(73) Assignee: Washtech Holding GmbH, Augsburg (DE)

( * ) Notice: Subject to any disclaimer, the term of this patent is extended or adjusted under 35 U.S.C. 154(b) by 212 days.

(21) Appl. No.: 12/845,105

(22) Filed: Jul. 28, 2010

(65) Prior Publication Data

US 2011/0035889 A1 Feb. 17, 2011

(30) Foreign Application Priority Data

Aug. 17, 2009 (DE) .................. 10 2009 037 772

(51) Int. Cl.
*B60S 3/06* (2006.01)

(52) U.S. Cl.
USPC ............................. 15/53.4; 15/28

(58) Field of Classification Search
USPC ........ 15/21.1, 28, 29, 34, 35, 49.1, 50.1, 53.4
IPC ........................................ B60S 03/06
See application file for complete search history.

(56) References Cited

U.S. PATENT DOCUMENTS

| | | | | |
|---|---|---|---|---|
| 1,773,993 A * | 8/1930 | Gillis | ........................... | 15/50.1 |
| 2,007,073 A * | 7/1935 | Clarke | .......................... | 15/49.1 |
| 2,142,933 A * | 1/1939 | Bickford | ....................... | 15/50.1 |
| 2,300,138 A * | 10/1942 | Steele | ............................ | 15/49.1 |
| 2,316,805 A * | 4/1943 | Overholser | .................... | 15/49.1 |
| 2,930,056 A | 3/1960 | Lappin | | |
| 3,349,266 A * | 10/1967 | Jepson et al. | ................. | 310/247 |
| 3,349,423 A * | 10/1967 | Lousberg | ........................ | 15/183 |
| 3,354,488 A * | 11/1967 | Tord | ............................... | 15/49.1 |
| 4,168,560 A * | 9/1979 | Doyel | ............................. | 15/29 |
| 4,192,037 A * | 3/1980 | Capra | ............................ | 15/53.4 |
| 4,809,382 A * | 3/1989 | Ravn | ................................. | 15/29 |
| 4,878,262 A * | 11/1989 | Stufflebeam et al. | .......... | 15/53.4 |
| 4,998,314 A * | 3/1991 | Borofsky | ............................ | 15/4 |
| 5,007,127 A * | 4/1991 | Paolo | ............................... | 15/29 |
| 5,345,640 A * | 9/1994 | Goss | ............................... | 15/88.2 |
| 5,647,841 A * | 7/1997 | Groenewold et al. | ......... | 601/114 |
| 5,742,966 A * | 4/1998 | Tono | ............................. | 15/49.1 |

(Continued)

FOREIGN PATENT DOCUMENTS

DE 102004060859 A1 7/2006
EP 1561658 A2 8/2005

*Primary Examiner* — Robyn Doan
*Assistant Examiner* — Tatiana Nobrega
(74) *Attorney, Agent, or Firm* — Fleit Gibbons Gutman Bongini & Bianco PL; Martin Fleit; Paul D. Bianco (57) ABSTRACT

The invention relates to a device for cleaning vehicle wheels that contains a rotary body driven rotationally by a drive motor about a central axis, with cleaning elements arranged on its front end face. An improved cleaning can be achieved by virtue of the fact that the rotary body contains at least one rotary plate equipped with additional cleaning elements that is rotated by the rotation of the rotary body, not only about the central axis but also, via a gear assembly, about its own longitudinal axis.

19 Claims, 6 Drawing Sheets

(56) References Cited

U.S. PATENT DOCUMENTS

| | | | |
|---|---|---|---|
| 5,797,157 A * | 8/1998 | Gregg | 15/49.1 |
| 8,047,736 B2 * | 11/2011 | Jordan | 401/284 |
| 2003/0019070 A1 * | 1/2003 | Field et al. | 15/320 |
| 2003/0019071 A1 * | 1/2003 | Field et al. | 15/320 |
| 2004/0181886 A1 * | 9/2004 | Alexander | 15/29 |
| 2006/0236474 A1 * | 10/2006 | Jaffe | 15/28 |
| 2006/0242774 A1 * | 11/2006 | Schmid | 15/29 |
| 2007/0136963 A1 * | 6/2007 | Vosbikian et al. | 15/4 |
| 2007/0151055 A1 * | 7/2007 | Chee et al. | 15/104.061 |
| 2009/0025159 A1 | 1/2009 | Rau | |
| 2010/0024139 A1 * | 2/2010 | Linsbichler et al. | 15/31 |

* cited by examiner

DEVICE FOR CLEANING VEHICLE WHEELS

CROSS REFERENCE TO RELATED APPLICATIONS

This application claims priority under 35 U.S.C. §119 to German Patent Application No. 10 2009 037 772.7 filed Aug. 17, 2009, the entire contents of which are incorportated herein by reference.

FIELD OF THE INVENTION

The invention relates to a device for cleaning vehicle wheels.

BACKGROUND OF THE INVENTION

Previously known devices for cleaning vehicle wheels generally have a wheel-washing brush configured as a plate brush that contains a brush body driven rotationally with the aid of a drive motor and that has cleaning brushes arranged on its end face for contact with a vehicle wheel. The movement possibilities for such wheel-washing brushes are limited, however, so that their effective range is correspondingly limited.

The problem of the invention is to create a device of the type mentioned above that allows an improved cleaning of the vehicle wheels.

This problem is solved by the device described herein. Expedient configurations and advantageous refinements of the invention are also described herein.

SUMMARY OF THE INVENTION

In the device according to the invention, the rotary body, driven by a drive motor about a central axis and equipped with cleaning elements such as a rim washing brush, comprises at least one rotary plate provided with additional cleaning elements, which is rotated by the rotation of the rotary body not only about the central axis but, via a gear unit, also about its own longitudinal axis. Within a rotary body constituting a main brush, it is possible in this manner, for example, for one or more inner brushes to be arranged that rotate at a speed corresponding to the drive motor on a circular path about the central axis of the rotary body, and additionally about their own axes at a different rotational speed. In this way an improved coverage of the surfaces to be cleaned, and thus an improved cleaning effect, is achievable.

One or more rotary plates with inner brushes or other cleaning elements can be arranged inside the rotary body. The mechanical coupling of the brushes has the effect that the outer brush carries out a rotation about the central axis and the inner brush or brushes carry out both a rotational movement about the central axis and a rotation about their own centers.

Inside the rotary body rotating about the central axis, one or more rotary plates can be arranged, wherein for example three rotary plates are provided at equal angles around the central axis of the rotary body in an expedient embodiment.

In a particularly expedient embodiment, the rotary disks can likewise be rotated by the drive motor via a transmission gear unit embodied as a planetary gear assembly, for example. The rotary disks can be driven by the transmission gear unit at a speed different from that of the rotary body, whereby an improved cleaning effect results. The several rotary plates with the cleaning elements, preferably in the form of brushes, arranged thereon need not have the same rotational speed either, i.e., both the diameter and the rotational speed can be different, which leads to favorable overlapping effects for rim washing.

In a compact construction, the rotary plates are arranged in corresponding openings of a cover plate of the rotary body.

An additional advantageous configuration is distinguished by having a device for applying a cleaning fluid integrated into the rotary body. This device can have supply lines and a rotary feed-through for transmitting the cleaning fluid, expediently under high pressure, from a stationary part into the revolving rotary body.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

FIGS. 1-4 and FIGS. 6-7 show different views of a first embodiment of a base body 3, rotatable by means of a drive motor 1 about a center axis 2, for a device for cleaning vehicle wheels in a vehicle washing system. The device shown contains a carriage 5 movably guided via linear guides 4, on which the disk-shaped base body 3, adapted to the size of the vehicle wheel rims, can be moved by a linear drive, not shown, between a retracted rest position and an advanced cleaning position.

Figure 1:
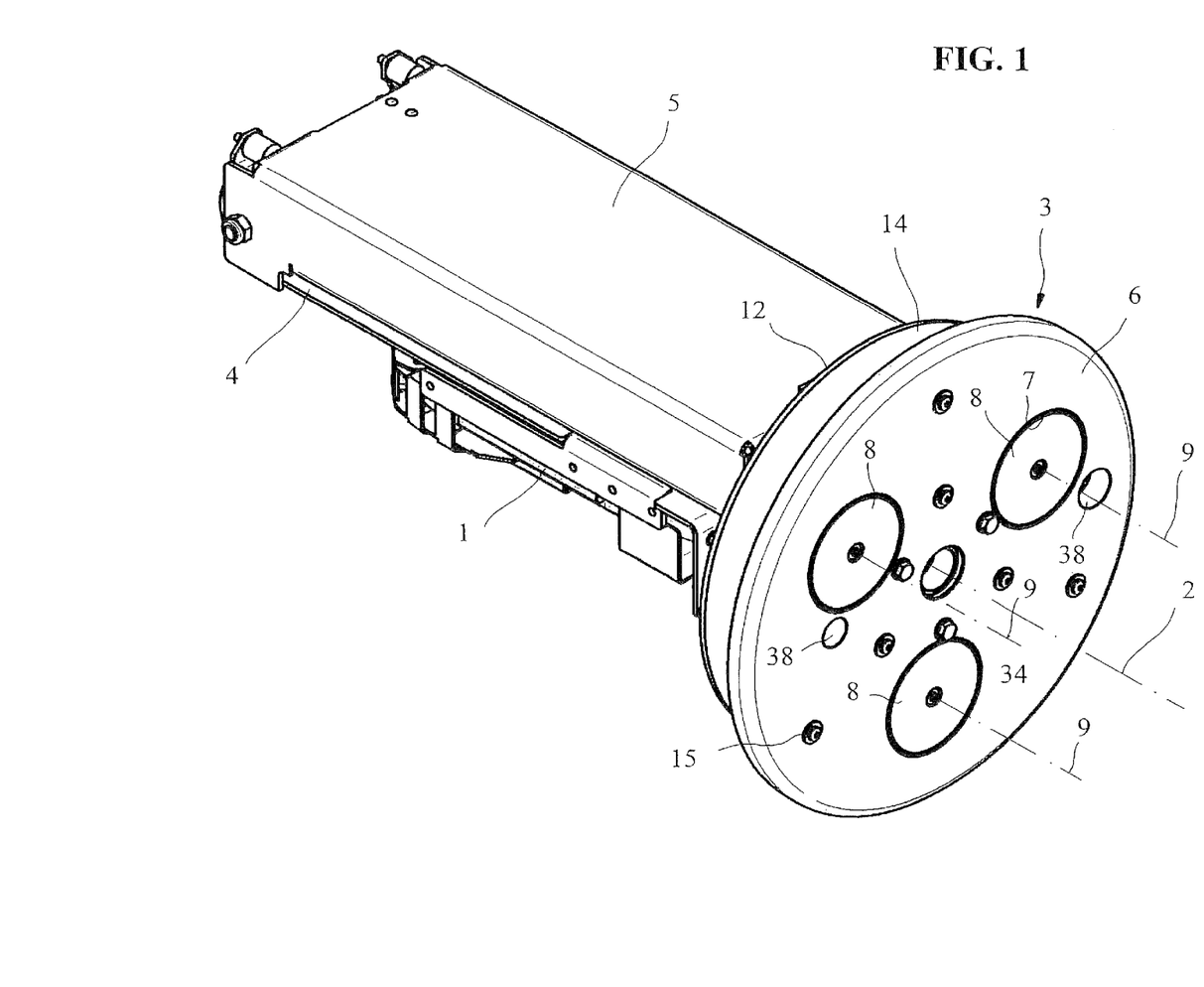
FIG. 1 shows, in a perspective view, a first embodiment of a device according to the invention for cleaning vehicle wheels.

As is evident from FIG. 1, the base body 3, constructed here in several parts, has three circular openings 7 with rotary disks 8 arranged therein in a front end plate 6. The rotary disks 8 in the illustrated embodiment are spaced at equal angles on a circle concentric with the central axis 2 and are rotated by the rotation of the base body 3 by means of the drive motor 1, not only about the central axis 2 but also about their own longitudinal axes 9 via a gear assembly to be described in detail below. As is schematically illustrated in an additional embodiment shown in cross section in FIG. 5, brush-like cleaning elements 10 for cleaning vehicle wheels are mounted on the front end plate 6 of the base body 3 rotatable about the central axis 2, and additional brush-like cleaning elements 11 are mounted on the front end faces of the rotary disks 8 rotatable about their longitudinal axes 9. The cleaning elements 10 and 11, illustrated herein as cleaning brushes, can be mounted directly or via separate carrying elements on the front end plate 6 or the rotary disks 8.

Figure 2:
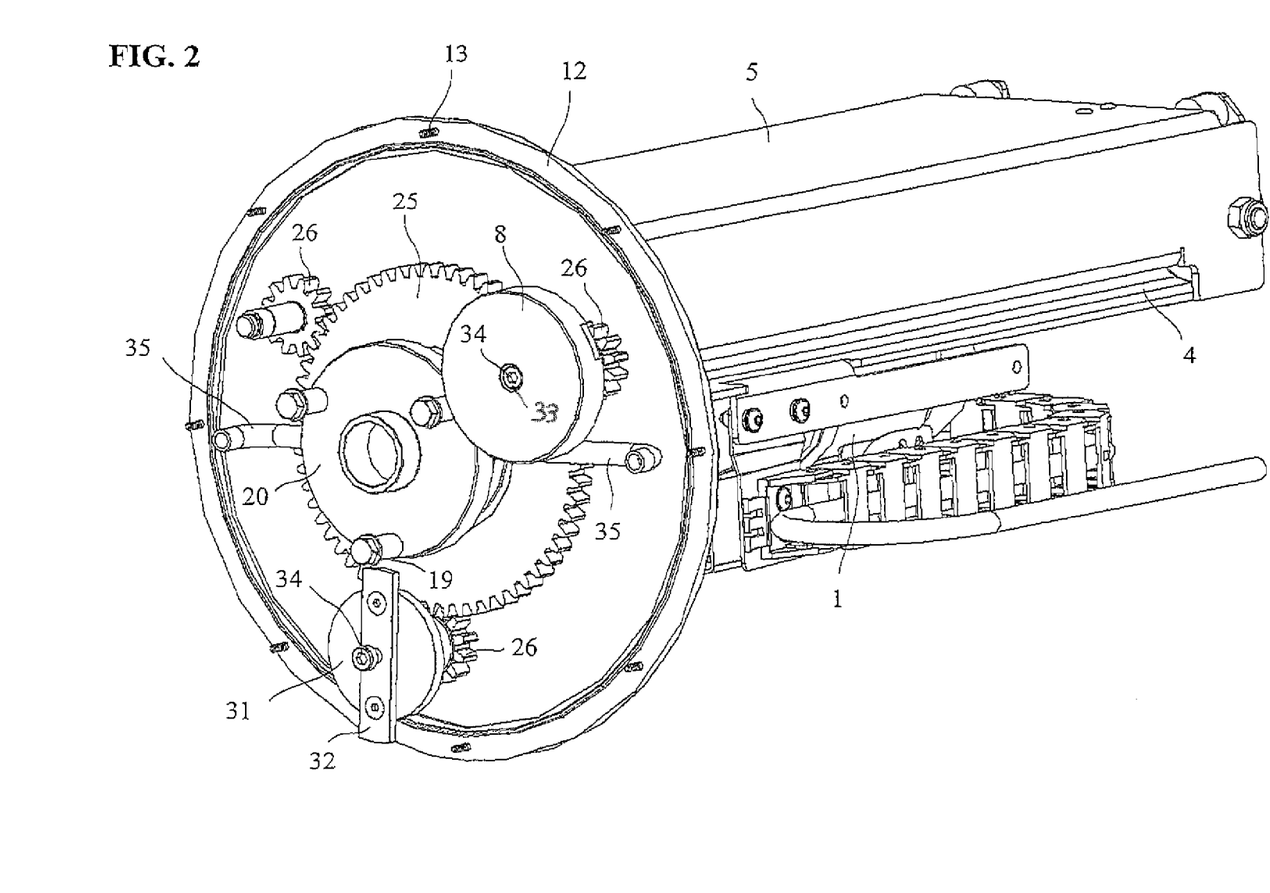
FIG. 2 shows the device shown in FIG. 1 with the front part dismantled.
Figures 3, 4:
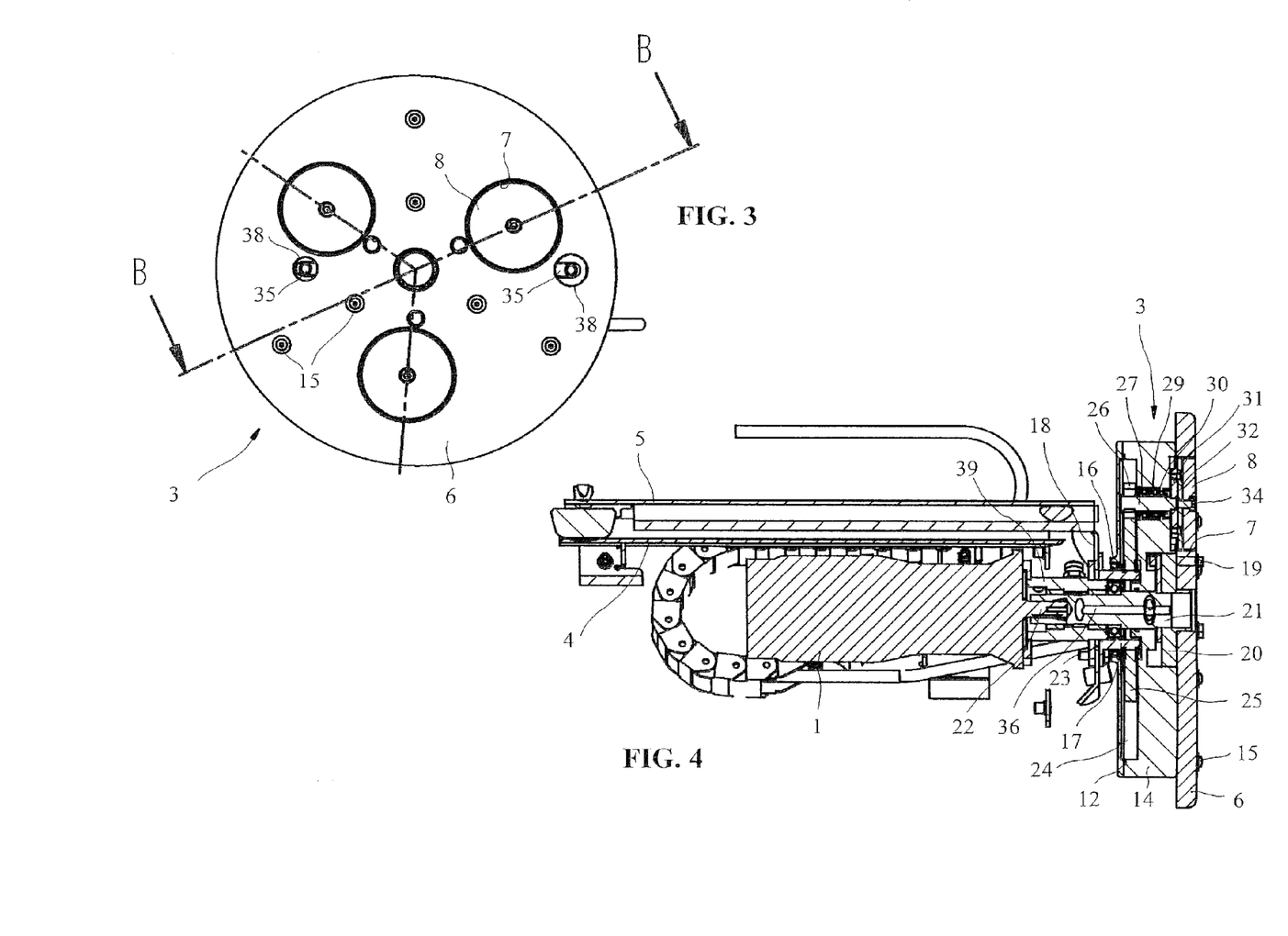
FIG. 3 shows a front view of the device of FIG. 1.
FIG. 4 shows a longitudinal section of the device of FIG. 1 along the lines A-A of FIG. 3.

It is evident from the sectional view of FIG. 4 that the base body 3 in the embodiment shown in FIG. 1 consists of a rear cover plate 12, an intermediate part 14 screwed to the cover plate 12 via the threaded rods 13 shown in FIG. 2, and the front end plate 6 screwed via screws 15 to the intermediate part 14. The cover plate 12 is rotatably seated via a bearing 16 on a rotationally fixed bearing bushing 17. The bearing bushing 17 is rotationally fixedly mounted on a downward-angled bearing plate 18 of the carriage 5. The front end plate 6 is fixed via mounting screws 19 to the end face of a drive disk 20 also visible in FIG. 2. The drive disk 20 is seated at the front end of a drive shaft 21, the rear of which is connected to a motor shaft 22 of the drive motor 1. The drive shaft 21 is rotatably seated inside the bearing bushing 17 via a bearing 23.

A planetary gear assembly with a sun wheel 25, also illustrated in FIG. 2, and three planetary gears 26 meshing with the sun wheel 25 are housed inside a cutout 24 between the rear cover plate 12 and the intermediate part 14 in the base body 3. The sun wheel 25 is rotationally fixed to the non-rotatable bearing bushing 17. The planetary gears 26 are seated on the end facing the cover plate 12 of shafts 27 that, projecting on both sides, are seated via bearings 29 shown in FIG. 4 in corresponding holes 30 of the intermediate part 14. Carrier plates 31 with drive ridges 32 mounted thereon are fixed to the other ends of the shafts 27 facing away from the front end plate 6. The rotary disks 8 with corresponding recesses 33 are placed in a form-fitting manner on the drive ridges 32 and are fixed by screws 34.

It is apparent in FIG. 2 that a cleaning agent supply system with a supply line 35 is contained inside the rotary plate 3. The supply line 35 contains two radially outward-running tube sections 35 angled forward at the ends, which are arranged diametrically opposite one another on the drive shaft 21 and are connected to a central supply channel 36 inside the drive shaft 21. The open ends of the tube sections that are angled forward project into holes 38 of the front end plate 6, as is evident from FIG. 3. Via a rotary feed-through 39 shown in FIG. 4, a cleaning fluid under high pressure can be directed through the central supply channel 36 to the two tube sections 35 and via the latter to the front side of the base body 3.

Figure 5:
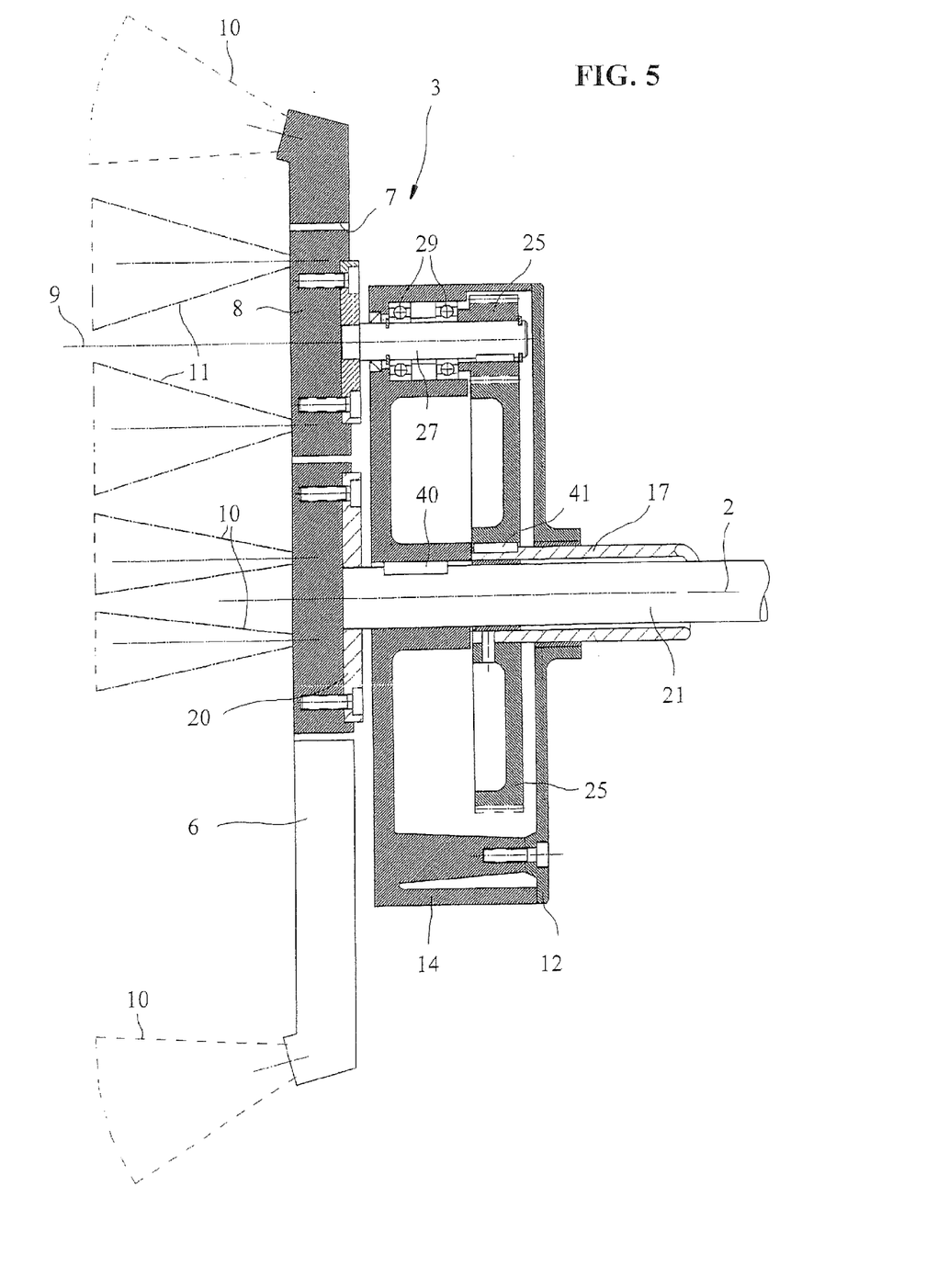
FIG. 5 shows an additional embodiment of a device for cleaning vehicle wheels.
Figure 6:
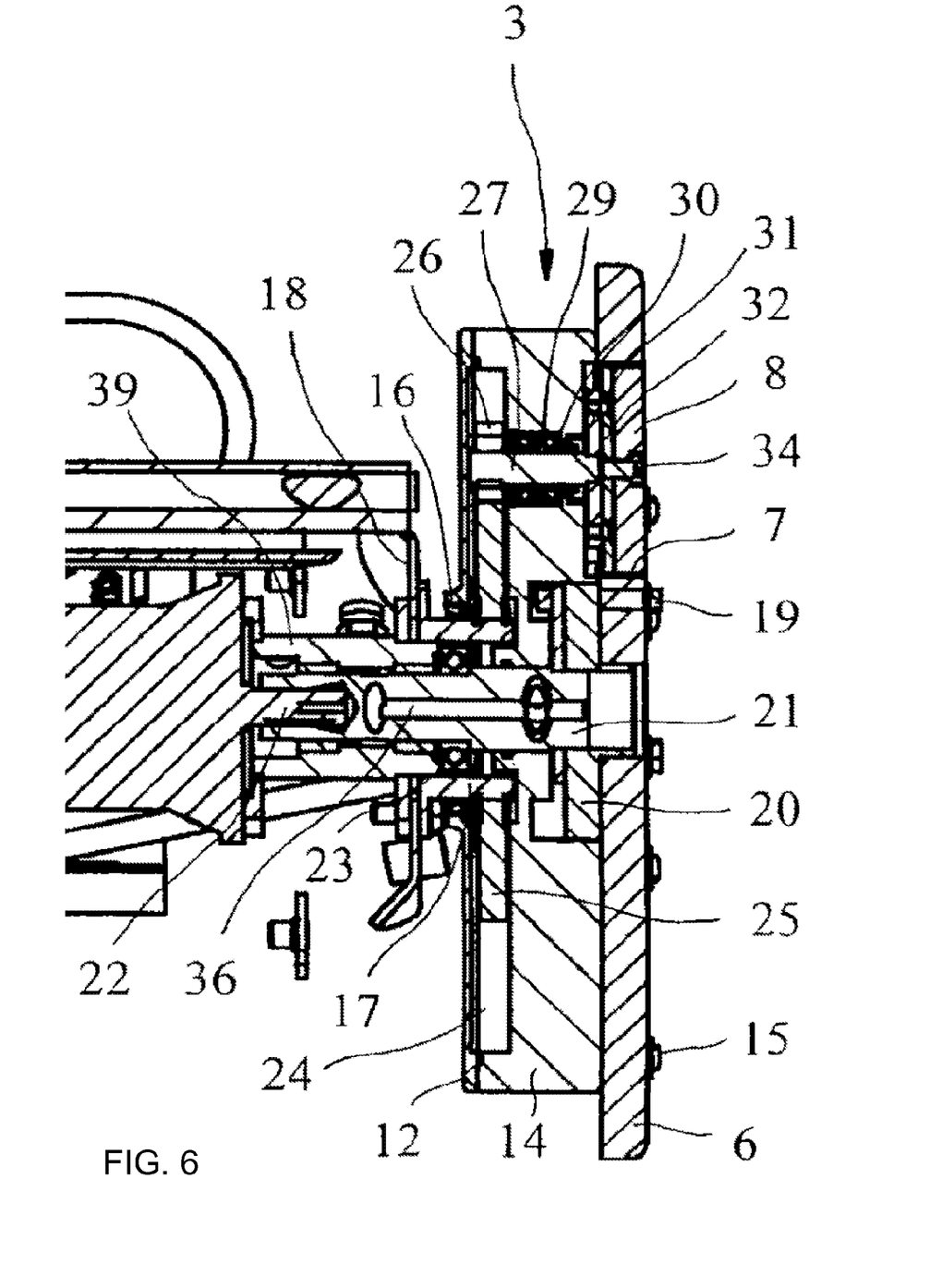
FIG. 6 shows an enlarged view of the frontal portion, in longitudinal section, of the device of FIG. 4.
Figure 7:
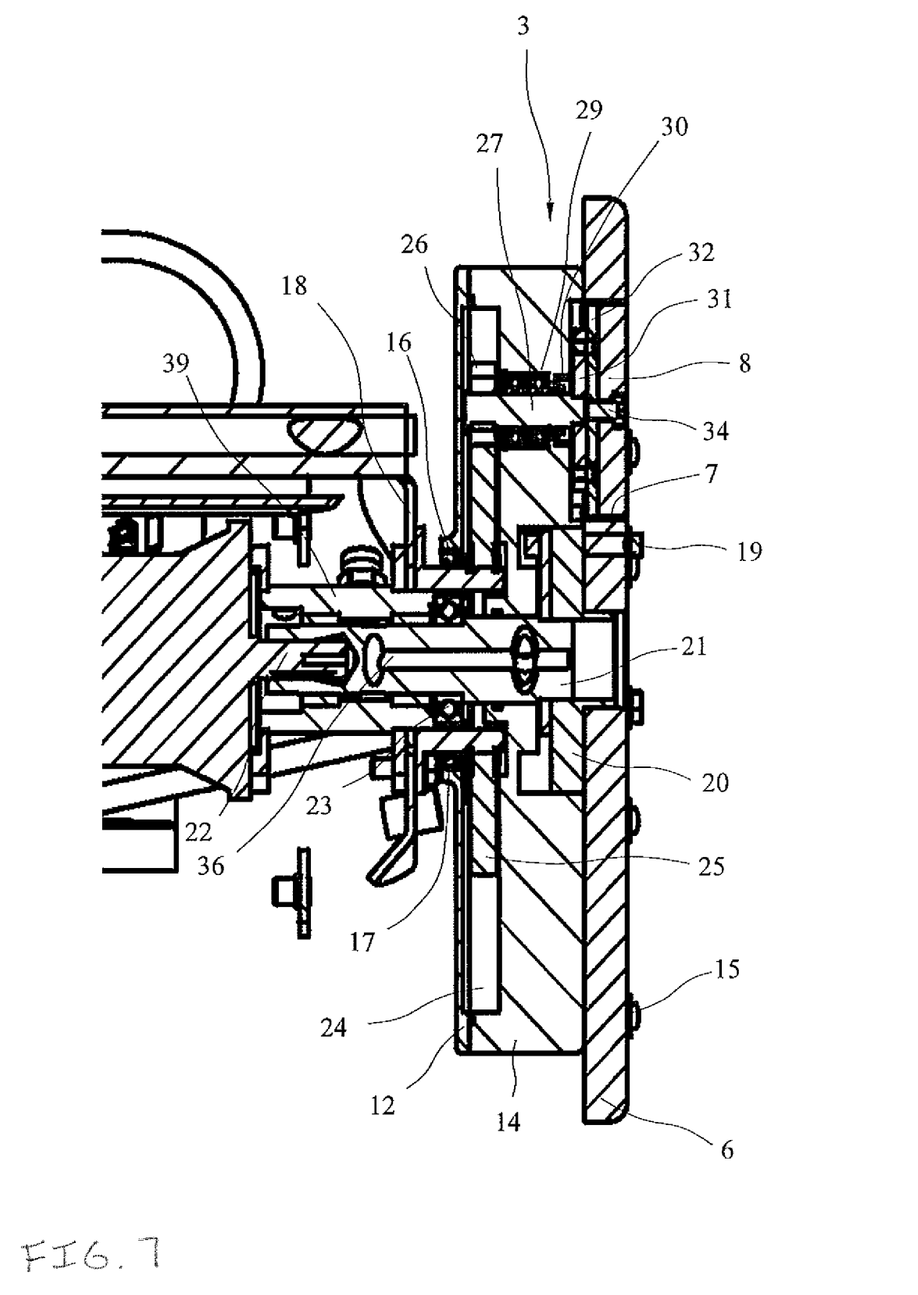
FIG. 7 shows an enlarged view of the frontal portion, in longitudinal section, of the device of FIG. 4.

Another embodiment of a rotatable base body 3 of a device for cleaning vehicle wheels is shown in a cross section in FIG. 5. In this embodiment as well, a front end plate 6 with one or more circular openings 7 is mounted on a drive disk 20 fixedly arranged at the front end of a drive shaft 21. A rotary plate 8 that is seated at the front end of a shaft 27 rotatably seated inside an intermediate member 14 is arranged in the opening 7. Brush-like cleaning elements 10 are arranged on the front end face of the front end plate 6 and additional brush-like cleaning elements 11 are arranged at the front end faces of the rotary disks 8 rotatable about their own longitudinal axes 9.

The intermediate member 14 is positively connected via a feather key 40 to the driveshaft 21 for joint rotation with the front end plate 6. In the embodiment shown, a drive disk 20 to which the front end plate 6 is screwed is mounted at the front end of the driveshaft 21. A planetary gear 26 that meshes with a sun wheel 25 rotationally fixedly arranged inside the base body 3 is seated at the rear end of a shaft 27 seated via bearings 29 inside the intermediate member 14. The sun wheel 25 is mounted, secured against rotation by an additional feather key 41, on a non-rotatable bearing bushing 17. For this purpose, the bearing bushing 17 arranged over the driveshaft 21 projects into the intermediate member 14 of the base body 3. A rear cover plate 12 that is rotatably guided on the bearing bushing is screwed onto the rear side of the intermediate member 14. In this embodiment as well, the rotary plate is set into rotation by the rotation of the cover plate 6 with the aid of the driveshaft 21, not only about the central axis but also, via the planetary gear unit, about its own longitudinal axis 9.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention.

What is claimed is:

1. A device, in a vehicle washing system, for cleaning wheels on a vehicle, comprising:
    a rotary body driven rotationally by a drive motor about a central axis, the rotary body including a front end plate having at least one substantially circular opening;
    a first group of cleaning elements arranged on the front end plate;
    at least one rotary plate having a longitudinal axis arranged within the substantially circular opening in the front end plate of the rotary body such that the rotary plate does not protrude past the front end plate, the rotary plate having a diameter substantially equivalent to a diameter of the circular opening, the rotary plate rotatable by rotation of the rotary body about the central axis and about its own longitudinal axis via a gear assembly; and
    a second group of cleaning elements arranged on a front face of the at least one rotary plate; wherein the device is coupled to the vehicle washing system, where during operation a vehicle is enclosed by the vehicle washing system such that the wheels of the vehicle are placed adjacent the device and the cleaning elements contact and clean the wheels.

2. The device according to claim 1, wherein the at least one rotary plate is driven by the gear assembly at a speed different from rotational speed of the rotary body.

3. The device according to claim 1, wherein the rotary body is fixedly connected to a driveshaft rotatable by the drive motor.

4. The device according to claim 1, wherein the gear assembly is constructed as a planetary gear unit having a sun wheel rotationally fixedly arranged inside the rotary body and a planetary gear associated with the at least one rotary plate.

5. The device according to claim 4, wherein the sun wheel is arranged on a non-rotatable bearing bushing protruding into the rotary body.

6. The device according to claim 4, wherein the planetary gear is arranged proximate to a shaft arranged inside the rotary body via bearings.

7. The device according to claim 1, wherein the front end plate is mounted on an intermediate member of the rotary body.

8. The device according to claim 7, wherein the intermediate member is connected to a rear cover plate of the rotary body.

9. The device according to claim 1, further comprising a cleaning agent supply system integrated into the rotary body.

10. The device according to claim 9, wherein the cleaning agent supply system includes a supply line and a rotary feed-through for supplying cleaning fluid via a central supply channel.

11. The device according to claim 1, wherein the rotary body includes a plurality of rotary plates distributed about the central axis.

12. A cleaning device, in a vehicle washing system, for cleaning wheels on a vehicle comprising:
    an end plate having a front side and a rear side, the end plate rotatable about a central axis by a drive shaft connected to the rear side of the end plate;

a plurality of openings in the front side of the end plate;
a plurality of rotary plates, each of the plurality of rotary plates arranged in each of the plurality of openings such that each of the rotary plates does not protrude past the end plate, each of the rotary plates having a diameter substantially equivalent to a diameter of each of the plurality of openings, each of the plurality of rotary plates rotable about a rotary axis substantially parallel to the central axis of the end plate cleaning elements arrange on the front end plate and/or the plurality of rotary plates; and
a supply line including at least two sections, each section arranged diametrically opposite the other section on the drive shaft, a first open end of each section extending into or through a hole in the end plate, wherein the supply line is operable to pass a fluid through the supply line and onto multiple points on the front side of the end plate; wherein the device is coupled to the vehicle washing system, where during operation a vehicle is enclosed by the vehicle washing system such that the wheels of the vehicle are placed adjacent the device and the cleaning elements contact and clean the wheels.

13. The cleaning device according to claim 12, wherein a second end of each section is connected to a central supply channel, thereby permitting a fluid to pass from the central supply channel through the sections, the fluid dispensing onto the front side of the end plate.

14. The cleaning device according to claim 12, wherein the drive shaft is connected to a sun wheel and each rotary plate is connected to a planetary gear, each planetary gear meshing with the sun wheel, thereby permitting rotation of each rotary plate about its respective rotary axis, in addition to rotation about the central axis by the drive shaft.

15. A device for cleaning a vertical surface, comprising:
a carriage;
a drive shaft having a fluid passing channel therein, the drive shaft rotatable with respect to the carriage;
a plate connected to the drive shaft and rotatable together therewith with respect to the carriage;
a gear assembly including a sun wheel operatively connected to the carriage;
a plurality of planetary gears meshed with the sun wheel, each of the plurality of planetary gears having a central axle connected to the plate and rotatable together therewith, each of the plurality of planetary gears rotatable about its central axle by the sun wheel when the plate is rotated with respect to the sun wheel;
a plurality of rotary plates arranged within openings in the plate connected to the drive shaft such that rotary plates do not protrude past the plate, each of the plurality of rotary plates having a diameter substantially equivalent to a diameter of the openings, each of the plurality of rotary plates operatively connected with each of the plurality of planetary gears;
a plurality of brushes, each of the plurality of brushes connected to one of the planetary gear axles to be rotated together therewith;
at least one fluid supply line communicatively coupled to the fluid passing channel of the drive shaft to dispense a fluid proximate the vertical surface to be cleaned; and
a guide connected to the carriage and configured to move the carriage between a position distal to the vertical surface to a position proximate the vertical surface for cleaning.

16. The device according to claim 15, wherein the fluid supply line includes a plurality of supply tubes, an open end of each of the plurality of supply tubes connected to the plate and extending towards the vertical surface to be washed, the open end of each of the plurality of supply tubes rotatable with the plate.

17. The device according to claim 16, wherein an open end of at least one of the plurality of supply tubes is positioned proximate at least one of the plurality of brushes to apply fluid to at least one of the plurality of brushes.

18. The device according to claim 15, wherein the guide is configured to move the carriage along a predetermined path between the position distal to the vertical surface and the position proximate the vertical surface.

19. The device according to claim 15, wherein the plate further comprises a brush connected to an end of the drive shaft.

* * * * *